(12) United States Patent
Maxwell

(10) Patent No.: US 11,062,303 B2
(45) Date of Patent: *Jul. 13, 2021

(54) CRYPTOGRAPHICALLY CONCEALING AMOUNTS TRANSACTED ON A LEDGER WHILE PRESERVING A NETWORK'S ABILITY TO VERIFY THE TRANSACTION

(71) Applicant: Blockstream Corporation, Montreal (CA)

(72) Inventor: Gregory Maxwell, Mountain View, CA (US)

(73) Assignee: Blockstream Corporation, Montreal (CA)

( * ) Notice: Subject to any disclaimer, the term of this patent is extended or adjusted under 35 U.S.C. 154(b) by 822 days.

This patent is subject to a terminal disclaimer.

(21) Appl. No.: 15/176,833

(22) Filed: Jun. 8, 2016

(65) Prior Publication Data
US 2016/0358165 A1 Dec. 8, 2016

Related U.S. Application Data

(60) Provisional application No. 62/172,684, filed on Jun. 8, 2015.

(51) Int. Cl.
*G06Q 20/38* (2012.01)

(52) U.S. Cl.
CPC ..... *G06Q 20/3829* (2013.01); *G06Q 2220/00* (2013.01)

(58) Field of Classification Search
CPC ........... G06Q 20/3829; G06Q 20/0655; G06Q 2220/00; H04L 9/3255; H04L 9/3239; H04L 2209/38

USPC .......................................................... 705/71
See application file for complete search history.

(56) References Cited

U.S. PATENT DOCUMENTS

| 2004/0123110 A1 | 6/2004 | Zhang et al. |
| 2004/0260926 A1 | 12/2004 | Modiane et al. |
| 2009/0193250 A1 | 7/2009 | Yokota et al. |

(Continued)

OTHER PUBLICATIONS

Rivest et al. (How to Leak a Secret, C. Boyd (Ed.): ASIACRYPT 2001, LNCS 2248, pp. 552-565, 2001, © Springer-Verlag Berlin Heidelberg 2001) (Year: 2001).*

(Continued)

*Primary Examiner* — James D Nigh
(74) *Attorney, Agent, or Firm* — Dergosits & Noah LLP; Todd A. Noah

(57) ABSTRACT

Systems and methods are described for encrypting an amount transacted on a blockchain ledger, while preserving the transaction's ability to be verified. A blinding amount is added to an input value, and an output value is generated and encrypted. Both the input value and the output value are within a value range, where a sum of any two values within the range does not exceed an overflow threshold. The sum of the encrypted input value and the encrypted output value may equal zero. Rangeproofs associated with each of the input value and the output value are generated. The rangeproofs prove that the input value and the output value fall within the value range, and each rangeproof may be associated with a different public key. Each public key may be signed with a ring signature based on a public key of a recipient in the transaction.

19 Claims, 5 Drawing Sheets

(56) References Cited

U.S. PATENT DOCUMENTS

2012/0089494 A1* 4/2012 Danezis ................ G06Q 50/06
  705/34
2012/0296829 A1* 11/2012 Camenisch ........ G06Q 30/0603
  705/67
2014/0189289 A1 7/2014 Weirich et al.

OTHER PUBLICATIONS

Möser (Anonymity of Bitcoin Transactions: An Analysis of Mixing Services, Münster Bitcoin Conference (MBC), Jul. 17-18, 2013, Münster, Germany, 10 pages) (Year: 2013).*
Van Saberhagen (CryptoNote v 2.0, Oct. 17, 2013, 20 pages) (Year: 2013).*
International Search Report and Written Opinion for International Application No. PCT/US16/36365; dated Oct. 20, 2016.
Maxwell. "Confidential Transactions", Jun. 1, 2015 (Jun. 1, 2015), pp. 1-6; Retrieved online: https:/lpeople.xiph.org/greg/-confidential_values.txt.
Noether, "Ring Confidential Transactions". 2015, pp. 1-34. Retrieved online: https:lleprint.iacr.org/2015/1098.pdf.

* cited by examiner

US 11,062,303 B2

CRYPTOGRAPHICALLY CONCEALING AMOUNTS TRANSACTED ON A LEDGER WHILE PRESERVING A NETWORK'S ABILITY TO VERIFY THE TRANSACTION

CROSS-REFERENCE TO RELATED APPLICATIONS

This application claims the benefit of U.S. Provisional Application No. 62/172,684, filed Jun. 8, 2015, which is incorporated herein in its entirety.

COPYRIGHT NOTICE

A portion of the disclosure of this patent document including any priority documents contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to digital cryptocurrencies, and more specifically systems and methods of encrypting a transaction in a digital cryptocurrency ledger such that the amount being transacted is concealed, the transaction's validity may still be verified by the network using publically available information.

SUMMARY OF THE INVENTION

Systems and methods are described for encrypting an amount transacted on a blockchain ledger, while preserving the transaction's ability to be verified. A processor may add a blinding amount to an input value being transacted to create an encrypted input value. An output value corresponding to the input value may be generated and encrypted to create an encrypted output value. The encrypted output value may include a corresponding blinding amount such that the input value blinding amount and the generated output value blinding amount cancel each other out when added together. Both the input value and the output value being transacted may be values falling with a value range, the value range being defined so that a sum of any two values within the range does not exceed an overflow threshold. A sum of the encrypted input value and the encrypted output value may be equal to zero. A plurality of rangeproofs may be generated, wherein a different rangeproof is associated with each of the input value being transacted and the generated output value. The rangeproofs may show that the value associated with each rangeproof falls within the value range, and each rangeproof may be associated with a different public key. Each public key may be cryptographically signed with a ring signature based on a public key of a recipient in the transaction, thereby encrypting the plurality of rangeproofs. To optimize memory usage, a single memory amount may shared among each pubkey. The encrypted input value, the encrypted output value, and the encrypted rangeproofs may be stored in a block, the block being subsequently published on a blockchain, where it may be subsequently verified.

Further described are systems and methods for performing verification of an encrypted transaction on a blockchain ledger. The encrypted input value, the encrypted output value, and the encrypted rangeproofs are received in a block appended to the blockchain. The encrypted input value and the encrypted output value are extracted from the received block, the encrypted input value including an input value being transacted and a blinding amount, the encrypted output value also including an associated blinding amount. The transaction is verified if the sum of the encrypted input value and the encrypted output value is zero, and the transaction is denied verification if the sum of the encrypted input value and the encrypted output value is a nonzero value.

In addition to the foregoing, various embodiments of the ring signature are described. In an exemplary embodiment, referred to herein as a Borromean ring signature, the input value is rewritten into base four. Each digit in the rewritten input value may be assigned to a ring, each ring having four public keys corresponding to possible values of the digit. Each digit may be encrypted using a digit-specific blinding factor, and a potential value for the digit may be assigned to a public key for that digit. The ring signature may then be generated using a private key, the ring signature being associated with a correctly-valued public key for each digit.

In an embodiment, the amount transacted on the blockchain ledger may be decrypted (e.g., by a recipient of the amount transacted) by first retrieving the block from the blockchain. The ring signature may be generated using a private key (e.g., of the recipient), the ring signature being associated with a correctly-valued public key for each digit of the encrypted input value. The correctly-valued public key may be selected from a group of four public keys for each digit of the encrypted input value. An XOR operation may be applied to the smallest digit of the ring encrypted input value, and the applying may be repeated for each digit. A repeated pattern within an output of the XOR operation may be identified. The positions of the repeated pattern within the output of the XOR operation may then be used to determine the input value from the encrypted input value.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

Figure 1:
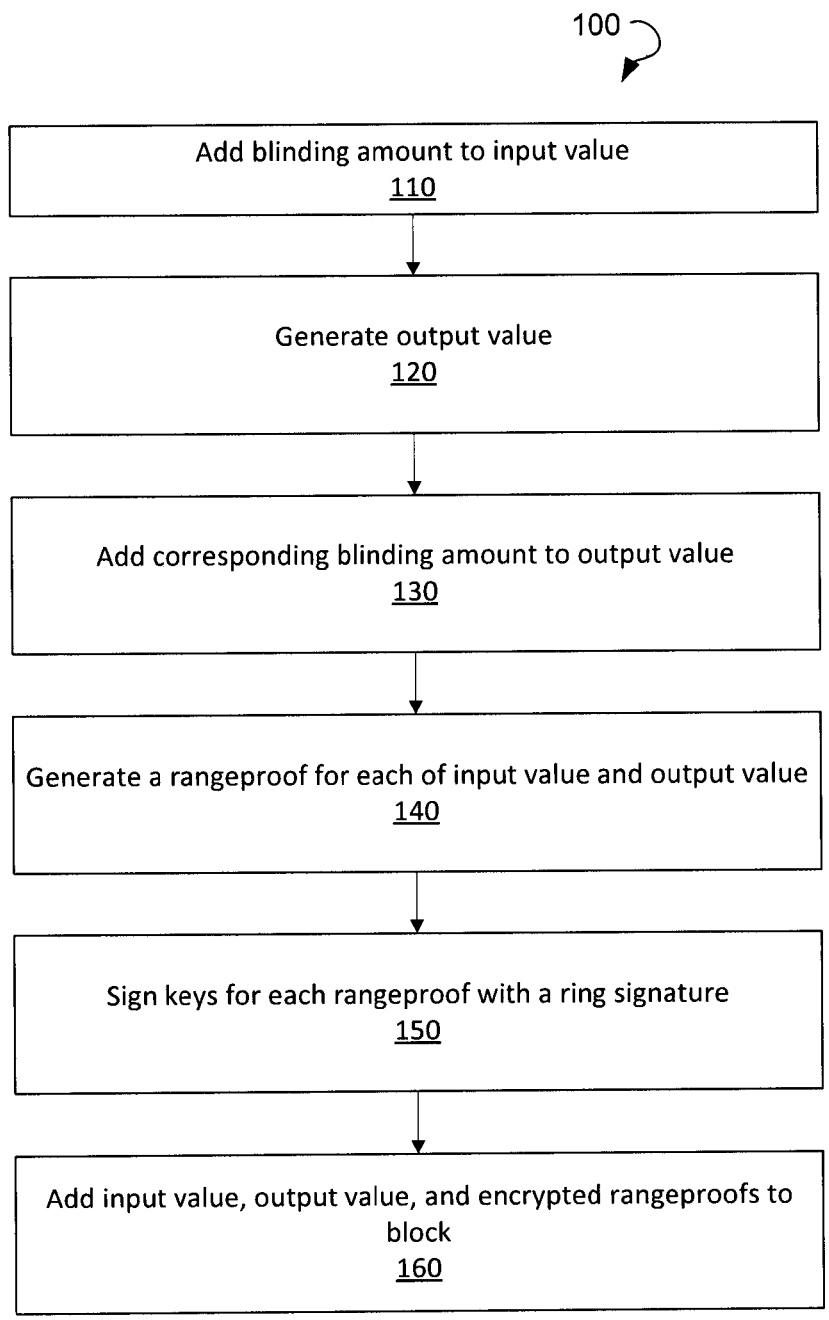
FIG. 1 shows a flow diagram for a encrypting an amount transacted on a blockchain ledger, in an embodiment.

The security of conventional cryptocurrencies, such as a Bitcoin ledger, is based on universal verification: each participant individually and autonomously verifies that each transaction is valid, without trusting any third party. An unfortunate side effect is that all the transaction data must be conspicuously public so it can be verified, which is at odds with the normal expectation of privacy for traditional monetary instruments. Insufficient financial privacy can have serious security and privacy implications for both commercial and personal transactions. Without adequate protection, dishonest users can focus their efforts on known high-value targets, competitors can learn business details, and negotiating positions can be undermined. Since publishing often requires spending money, lack of privacy can chill free speech. Insufficient privacy can also result in a loss of fungibility—where some coins are treated as more acceptable than others—which would further undermine a cryptocurrency's utility as money.

Bitcoin partially addresses the privacy problem by using pseudonymous addresses. If someone does not know which users own which addresses, the privacy impact may be reduced. But any time a transaction is made with a user, at least one of that user's addresses becomes known to the other party of the transaction. From there, the other party could trace out other connected addresses and estimate the values of their transactions and holdings. For example, suppose an employer pays an employee with Bitcoin, and the employee later spends those coins on rent and groceries. Both the employee's landlord and the supermarket would learn the employees income (and could charge higher prices as the employee's income changes or target the employee for theft).

There are existing deployed techniques that further improve privacy in Bitcoin (such as CoinJoin, which merges the transaction history of users by making joint payments), but the utility of these techniques is reduced by the fact that it's possible to track amounts. There have been proposed cryptographic techniques to improve privacy in Bitcoin-like systems, but so far all of them may result in breaking "pruning" and result in participants needing a perpetually growing database to verify new transactions, because these systems prevent learning which coins have been spent. Most proposed cryptographic privacy systems also have poor performance, high overhead, and/or require new and very strong (and less well understood) cryptographic assumptions.

The systems and methods described herein improve the situation by making the transaction amounts private, while preserving the ability of the public network to verify that the ledger entries still add up. This may be done without adding any new basic cryptographic assumptions to the Bitcoin system, and with a manageable level of overhead. As a side-effect of its design, the additional exchange of private "memo" data (such as invoice numbers or refund addresses) may be allowed by the described encryption methods, without any further increase in transaction size, by reclaiming most of the overhead of the cryptographic proofs used to make the transaction amounts private.

FIG. 1 shows a flow diagram 100 for a encrypting an amount transacted on a blockchain ledger, in an embodiment.

A processor may add a blinding amount to an input value being transacted to create an encrypted input value at step 110. To encrypt an input value of a transaction, a particular type of commitment may be selected that preserves the additive property. A commitment scheme maintains data secrecy but commits to the data so that it cannot be changed later by the sender of the data. A simple commitment scheme can be constructed using an exemplary cryptographic hash:

$$\text{commitment}=\text{SHA256}(\text{blinding\_factor}\|\text{data})$$

If a party only knows the commitment, then they cannot determine what underlying data values have been committing to (given certain assumptions about the properties of the hash). Both the data and the blinding factor may be revealed later, and a recipient of the commitment can run the hash and verify that the committed data matches the revealed data. The blinding factor is present because without one, someone could try guessing at the data.

A Pedersen commitment works like the above but with an additional property: commitments can be added, and the sum of a set of commitments is the same as a commitment to the sum of the data (with a blinding key set as the sum of the blinding keys):

$$C(BF1, \text{data}1)+C(BF2, \text{data}2)==C(BF1+BF2, \text{data}1+\text{data}2)$$

$$C(BF1, \text{data}1)-C(BF1, \text{data}1)==0$$

In other words, the commitment preserves addition and the commutative property applies (i.e., the Pedersen commitment is additively homomorphic, in that the underlying data may be manipulated mathematically as if it is not encrypted. For example, given input data values data_n=$\{1,1,2\}$ and a blinding factor BF_n=$\{5,10,15\}$ then:

$$C(BF1, \text{data}1)+C(BF2, \text{data}2)-C(BF3, \text{data}3)==0.$$

In an embodiment, Pedersen commitments used to encrypt the input value may be constructed using elliptic curve points. Conventionally, an elliptic curve cryptography (ECC) pubkey is created by multiplying a generator for the group (G) with the secret key (x):

$$\text{Pub}=xG.$$

The result may be serialized as a 33-byte array. ECC public keys may obey the additively homomorphic property mentioned before with respect to Pedersen commitments. That is:

$$\text{Pub}1+\text{Pub}2=(x1+x2(\bmod n))G.$$

The Pedersen commitment for the input value may be created by picking an additional generator for the group (H, in the equations below) such that no one knows the discrete log for second generator H with respect to first generator G (or vice versa), meaning no one knows an x such that xG=H. This may be accomplished, for example, by using the cryptographic hash of G to pick H:

$$H=\text{to\_point}(\text{SHA256}(\text{ENCODE}(G))).$$

Given the two generators G and H, an exemplary commitment scheme to encrypt the input value may be defined as:

$$\text{commitment}=xG+aH$$

Here x may be the secret blinding factor, and a may be the input value being committing to. The Pedersen commitments are information-theoretically private: for any commitment, there exists some blinding factor which would make any amount match the commitment. The Pedersen commitments may be computationally secure against fake commitment, in that the arbitrary mapping may not be computed. If the commitment may be computed, it means that the discrete log of G and H with respect to one another are known, which means that the security of the group is compromised.

Accordingly, the normal 8-byte integer amounts in Bitcoin transactions may be replaced by 33-byte Pedersen commitments in some embodiments. An output value corresponding to the input value may be generated and encrypted (e.g. also using the Pedersen commitment described above) to create an encrypted output value at step 120. The encrypted output value may include a corresponding blinding amount, added at step 130, such that the input value blinding amount and the generated output value blinding amount cancel each other out when added together. That is, if the sender of an asset in a transaction takes care in picking the blinding factors so that they add up correctly, then the network can still verify the transaction by checking that its commitments add up to zero:

(In1+In2+In3+plaintext_input_amount*
  H . . . )−(Out1+Out2+Out3+ . . . fees*H)==0.

Verification using the Pedersen commitment may require making the fees in a transaction explicit. However, this may be desirable Unfortunately, without additional measures, a Pedersen commitment alone may be insecure. The problem is that the group is cyclic, and addition is mod P (a 256-bit prime number that defines the order of the group). As a result, addition of large values can 'overflow' and behave like negative amounts. This means that a sums-to-zero behavior still holds when some outputs are negative, effectively allowing the creation of 5 coins from nothing: (1+1)−(−5+7)==0 This would be interpreted as "a userspends two bitcoins, gets a '−5' bitcoin out that they discard out, and a 7 bitcoin output," thereby allowing a malicious user to cause currency inflation.

In order to prevent this, when there are multiple outputs a proof is used to show that each committed generated output is within a value range which cannot overflow (e.g. [0, 2^64]). Both the input value and the output value being transacted may be values falling with the value range, the value range being defined so that a sum of any two values within the range does not exceed an overflow threshold (e.g., the maximum possible value, such as 2^64). The value range may be set by the sender of the asset associated with the input value in some embodiments.

Accordingly, a plurality of rangeproofs may be generated at step 140, wherein a different rangeproof is associated with each of the input value being transacted and the generated output value. The rangeproofs may prove that a committed amount is within the value range but reveal nothing else about the value. If an ECC signature is constructed so that the 'message' is a hash of the pubkey, the signature may prove that the signer knew the private key, which is a discrete log of the pubkey with respect to some generator (like G or H discussed above). For a 'pubkey' like P=xG+aH, no one knows the discrete log of P with respect to G because of the addition of H, because no one knows an x for xG=H, except for the edge case where the input value a is 0. If a is zero then P=xG and the discrete log is just x; someone could sign for that pubkey.

The rangeproofs may show that the value associated with each rangeproof falls within the value range, and each rangeproof may be associated with a different public key, signed at step 150. Each public key may be cryptographically signed with a ring signature based on a public key of a recipient in the transaction, thereby encrypting the plurality of rangeproofs. To avoid giving away the input value being transacted, a ring signature may be used. A ring signature is a signature scheme where there are two (or more) pubkeys and the signature proves that the signer knows the discrete log of at least one of the pubkeys. The ring signature together with the range proof may prove a commitment that commitment C is either 0 or 1—also known as an "OR proof". First, commitment C to the input value is provided, and C is computed by a recipient of the input value (using a private key held by the recipient, which includes the blinding factor):

C′=C−1H.

Then a ring signature over {C, C′} is provided. If C was a commitment to 1 then the recipient would not know its discrete log, but C′ becomes a commitment to 0 and the recipient would know its discrete log (just the blinding factor, known by the recipient). If C was a commitment to 0, the recipient would know its discrete log, and would not know the discrete log for C′. If C was a commitment to any other amount, none of the results of the ring signature would be zero and the recipient won't be able to sign to decrypt the encrypted input value. This works for any pair of numbers, just by suitably pre-processing the amounts that are put into the ring . . . or even for more than two numbers. For example, in a case where a sender wishes to generate a rangeproof showing that commitment C is in the value range [0, 32]. The sender may send the recipient a collection of commitments and OR proofs for each of them. Each commitment may be associated with a digit of the input value. For example, the following commitments may be included in a rangeproof:

C1is 0 or 1 C2 is 0 or 2 C3 is 0 or 4 C4 is 0 or 8
  C5 is 0 or 16.

If the sender selects the blinding factors for C1-5 correctly then C1+C2+C3+C4+C5=C. Effectively the input value has been built in binary, and the resulting 5-bit number can only be in the range [0,32].

Numerous optimizations may make rangeproof generation more efficient. To optimize memory usage, a single memory amount may shared among each pubkey. For example, a Borromean ring signature may be used, which is especially efficient: it requires only 32 bytes per pubkey, plus 32 bytes which can be shared by many separate rings. The Borromean ring may have twice the asymptotic efficiency of previously proposed constructions for this application. In a further embodiment, each rangeproof may include a plurality of component values, where each component value is a base ten exponent. That is, instead of expressing the amount directly in binary, encrypted amounts may be expressed using a decimal floating point where the digits are multiplied by a base 10 exponent. This means that large amounts may be proven with relatively small proofs, so long as they have few significant digits in base 10: e.g., 11.2345 and 0.0112345 can have the same size proof, even though one number is a thousand times larger. The ring signature may further be associated with a leftover amount that is not scaled by an exponent in some embodiments. In embodiments using base ten, for example, numbers less than ten would not be scaled by an exponent. The number less than ten could be expressed as a non-private "minimum amount" sent, which allows a smaller proof to cover a larger range if the user doesn't mind leaking some information about the minimum amount (which might already be public for external reasons); this also allows the least significant digits to be non-zero when an exponent is used. Minimum amounts may be supported by first subtracting the minimum, then proving that the result is non-negative.

Figure 2:
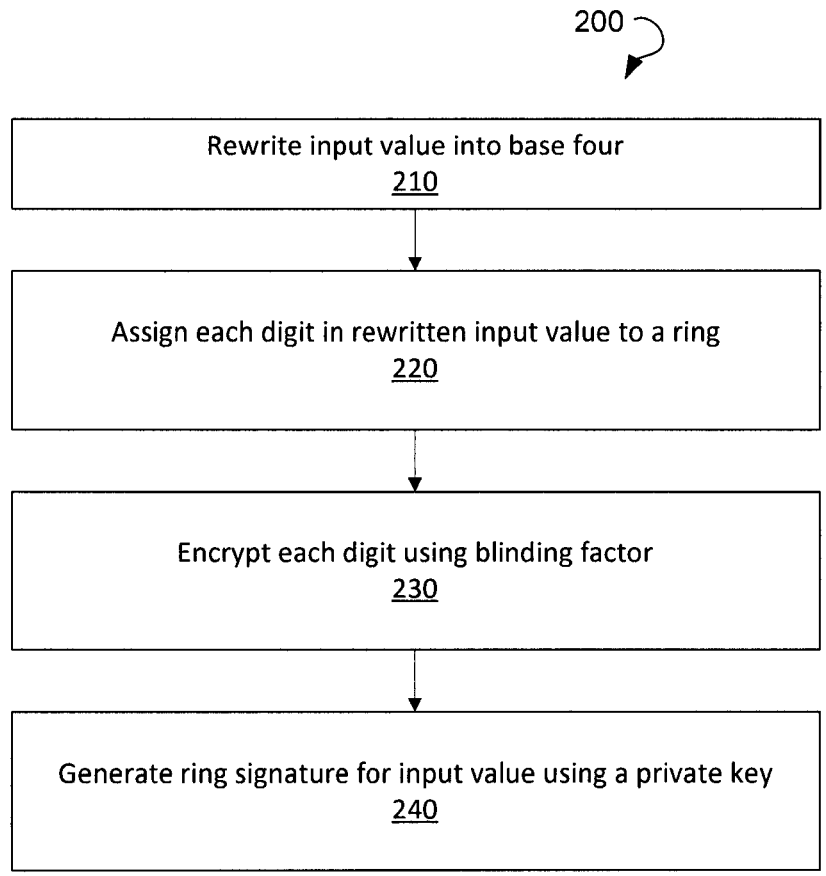
FIG. 2 shows a flow diagram for creating a ring signature for an encrypted input value, in an embodiment.

FIG. 2 shows a flow diagram for an exemplary method 200 for creating a ring signature for an encrypted input value. In the exemplary embodiment of method 200, referred to herein as a Borromean ring signature, the input value is rewritten into base four at step 210. The mantissa of the floating point may be encoded using rings of size 4 (base 4) rather than binary, because this may minimize the number of commitments sent while not using any more signature data than base two. The final mantissa digit commitment can be skipped, backwards constructing it from the value being proven and the other digits, etc.

Figure 4:
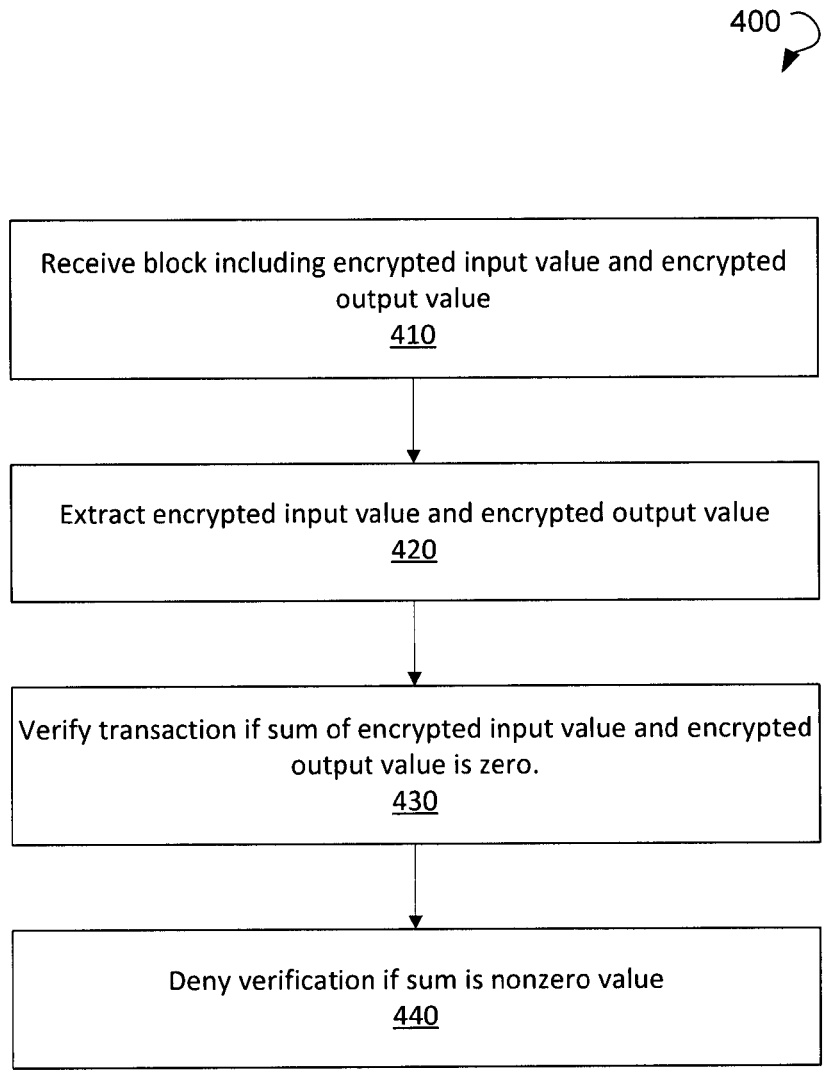
FIG. 4 shows a flow diagram for verifying an encrypted transaction on a blockchain, in accordance with various embodiments of the present invention.

Each digit in the rewritten input value may be assigned to a ring at step 220, where each ring has four public keys corresponding to possible values of the digit. Each digit may be encrypted using a digit-specific blinding factor at step 230, and a potential value for the digit may be assigned to a public key for that digit. The ring signature may then be generated using a private key at step 240, the ring signature being associated with a correctly-valued public key for each digit. Returning to FIG. 1, the encrypted input value, the encrypted output value, and the encrypted rangeproofs may be stored in a block at step 160. The block may then be published on a blockchain, where it may be subsequently verified. FIG. 4 shows a flow diagram for an exemplary method 400 for verifying an encrypted transaction on a blockchain. The encrypted input value, the encrypted output value, and the encrypted rangeproofs are received in a block appended to the blockchain at step 410. The encrypted input value and the encrypted output value may be extracted from the received block at step 420. As described above, the encrypted input value may include the input value being transacted and a blinding amount. The encrypted output value may also include an associated blinding amount. The transaction is verified at step 430 if the sum of the encrypted input value and the encrypted output value is zero. Likewise, the transaction is denied verification if the sum of the encrypted input value and the encrypted output value is a nonzero value at step 440. Accordingly, the transaction may be verified as a valid transaction, where the inputs equal the outputs, without a verifier actually knowing the amounts transacted.

Figure 3:
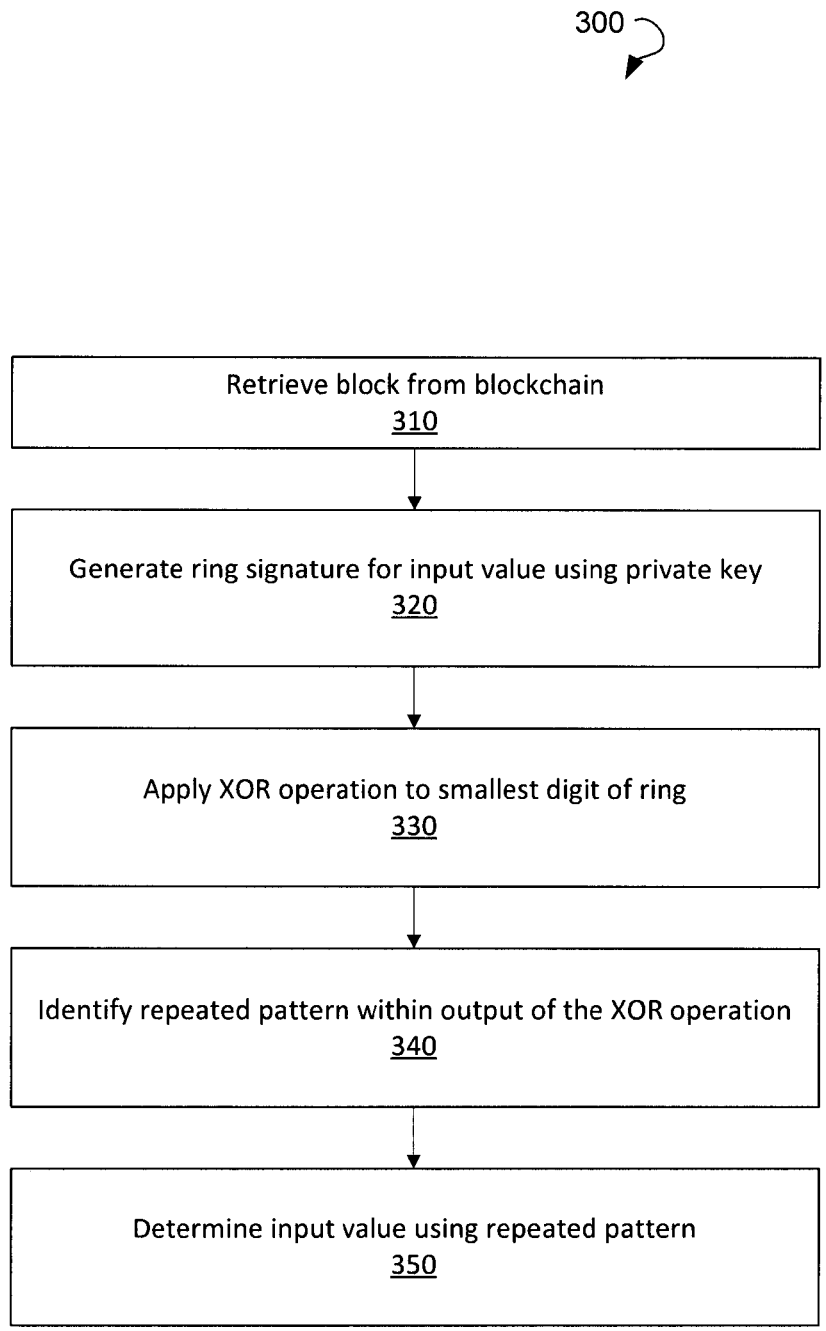
FIG. 3 shows a flow diagram for decrypting an input value from an encrypted input value signed with a ring signature, in accordance with various embodiments of the present invention.

As for the recipient of the asset having the input value, the input value may be decrypted using a private key held by the recipient. FIG. 3 shows a flow diagram for an exemplary method 300 for decrypting an input value from an encrypted input value signed with a ring signature. The block may be retrieved from the blockchain at step 310. The ring signature, generated during the encryption process may be regenerated using a private key (e.g., of the recipient) at step 320. The ring signature may be associated with a correctly-valued public key for each digit of the encrypted input value, in addition to a plurality of incorrectly-valued public keys for each digit. The correctly-valued public key may be selected from a group of, for example, four public keys for each digit of the encrypted input value. An XOR operation may be applied to each digit of the ring-encrypted input value, starting with the smallest digit, at step 330. The applying the XOR operation may be repeated for each digit of the encrypted input value. A repeated pattern within an output of the XOR operation may be identified at step 340. The positions of the repeated pattern within the output of the XOR operation may then be used to determine the input value from the encrypted input value at step 350.

Finally, by careful use of derandomized signing in the proof, it's possible for the receiver of the coins—who shares a secret with the sender, due to ECDH key agreement with the receivers pubkey—to 'rewind' the proof and use it to extract a message sent by the sender, which may be up to 80% of the size of the proof. The message may be used, for example, to provide the value and blinding factor to the receiver, but could also be used to include information like reference numbers or refund addresses. The result is that a proof for a 32-bit value is 2564 bytes, and simultaneously may convey 2048 bytes of message. A 32-bit proof can cover a range of 42.94967296 BTC with 1 e-8 precision, or 429.4967296 BTC with 1 e-7 precision, and so on. The implementation supports proofs of any mantissa size or exponent, with the parameters controlled by the sender. Performance and size may be linear in the number of mantissa bits, and odd numbers of bits are supported (by switching to radix-2 for the last digit). In some embodiments, the rangeproofs are only required in cases where there are multiple confidential value outputs (including fees). Transactions that merge multiple confidential amounts into a single output may not need range proofs, since the fact that all the inputs were in range may provide sufficient protection against overflow.

Figure 5:
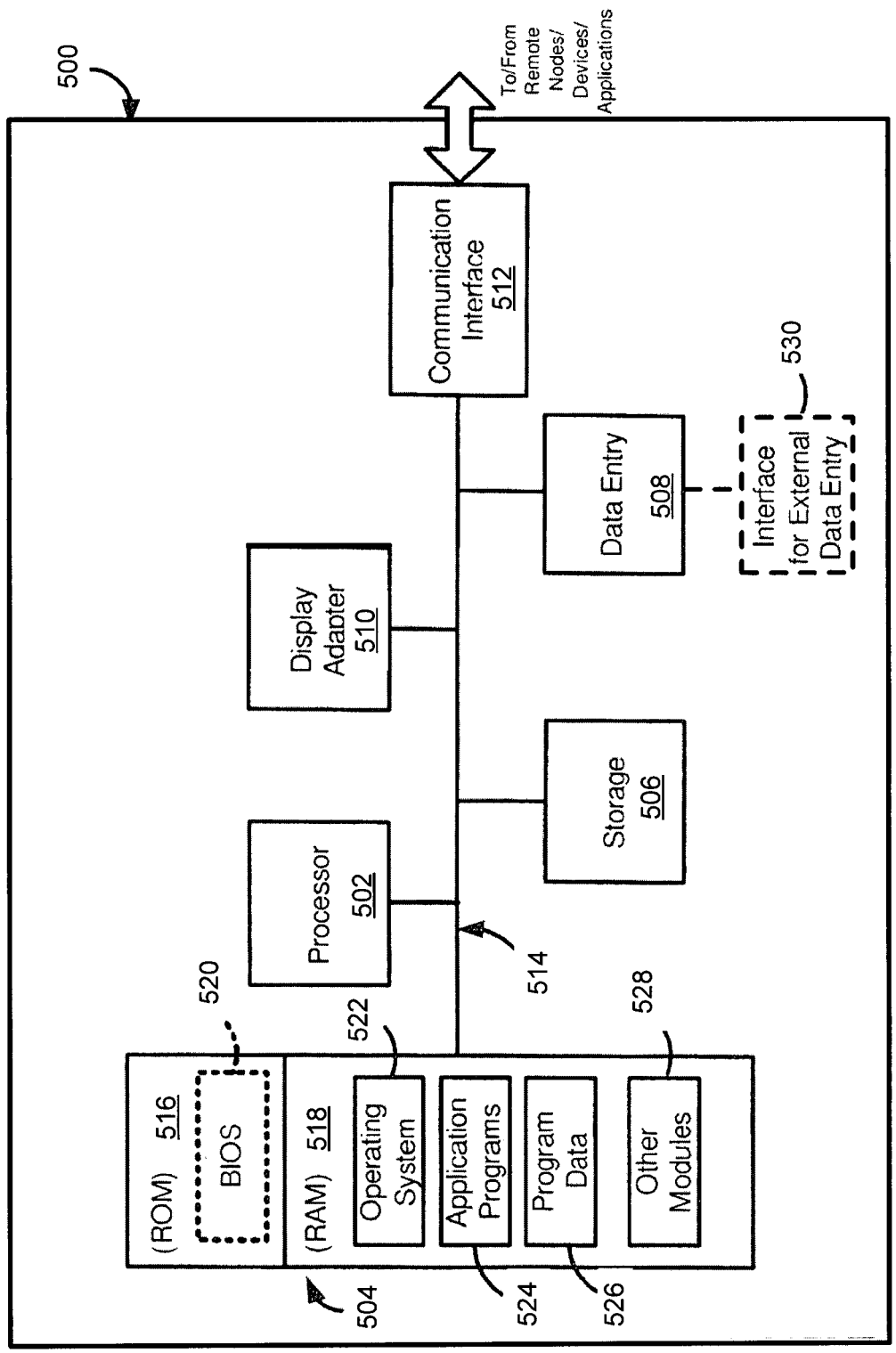
FIG. 5 is a block diagram of an exemplary system used for encrypting transaction values on a blockchain in accordance with various embodiments of the present invention.

FIG. 5 is a block diagram of an exemplary system for providing a pegged sidechain in accordance with various embodiments of the present invention. With reference to FIG. 5, an exemplary system for implementing the subject matter disclosed herein, including the methods described above, includes a hardware device 500, including a processing unit 502, memory 504, storage 506, data entry module 508, display adapter 510, communication interface 512, and a bus 514 that couples elements 504-512 to the processing unit 502.

The bus 514 may comprise any type of bus architecture. Examples include a memory bus, a peripheral bus, a local bus, etc. The processing unit 502 is an instruction execution machine, apparatus, or device and may comprise a microprocessor, a digital signal processor, a graphics processing unit, an application specific integrated circuit (ASIC), a field programmable gate array (FPGA), etc. The processing unit 502 may be configured to execute program instructions stored in memory 504 and/or storage 506 and/or received via data entry module 508.

The memory 504 may include read only memory (ROM) 516 and random access memory (RAM) 518. Memory 504 may be configured to store program instructions and data during operation of device 500. In various embodiments, memory 504 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 504 may also include nonvolatile memory technologies such as nonvolatile flash RAM (NVRAM) or ROM. In some embodiments, it is contemplated that memory 504 may include a combination of technologies such as the foregoing, as well as other technologies not specifically mentioned. When the subject matter is implemented in a computer system, a basic input/output system (BIOS) 520, containing the basic routines that help to transfer information between elements within the computer system, such as during start-up, is stored in ROM 516.

The storage 506 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 500.

It is noted that the methods described herein can be embodied in executable instructions stored in a non-transitory computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 506, ROM 516 or RAM 518, including an operating system 522, one or more applications programs 524, program data 526, and other program modules 528. A user may enter commands and information into the hardware device 500 through data entry module 508. Data entry module 508 may include mechanisms such as a keyboard, a touch screen, a pointing device, etc. Other external input devices (not shown) are connected to the hardware device 500 via external data entry interface 530. By way of example and not limitation, external input devices may include a microphone, joystick, game pad, satellite dish, scanner, or the like. In some embodiments, external input devices may include video or audio input devices such as a video camera, a still camera, etc. Data entry module 508 may be configured to receive input from one or more users of device 500 and to deliver such input to processing unit 502 and/or memory 504 via bus 514.

The hardware device 500 may operate in a networked environment using logical connections to one or more remote nodes (not shown) via communication interface 512. The remote node may be another computer, a server, a router, a peer device or other common network node, and typically includes many or all of the elements described above relative to the hardware device 500. The communication interface 512 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 512 may include logic configured to support direct memory access (DMA) transfers between memory 504 and other devices.

In a networked environment, program modules depicted relative to the hardware device 500, or portions thereof, may be stored in a remote storage device, such as, for example, on a server. It will be appreciated that other hardware and/or software to establish a communications link between the hardware device 500 and other devices may be used.

It should be understood that the arrangement of hardware device 500 illustrated in FIG. 5 is but one possible implementation and that other arrangements are possible. It should also be understood that the various system components (and means) defined by the claims, described above, and illustrated in the various block diagrams represent logical components that are configured to perform the functionality described herein. For example, one or more of these system components (and means) can be realized, in whole or in part, by at least some of the components illustrated in the arrangement of hardware device 500. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 5. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

For purposes of the present description, the terms "component," "module," and "process," may be used interchangeably to refer to a processing unit that performs a particular function and that may be implemented through computer program code (software), digital or analog circuitry, computer firmware, or any combination thereof.

It should be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for encrypting an amount transacted on a blockchain ledger, the method comprising:
   receiving, by a processor, an input value to a transaction;
   adding, by the processor, a blinding amount to the received input value, thereby creating an encrypted input value;
   generating, by the processor, an output value corresponding to the input value;
   encrypting, by the processor, the generated output value to create an encrypted output value, the encrypted output value including a corresponding blinding amount such that the input value blinding amount and the generated output value blinding amount cancel each other out when added together, wherein both the input value and the output value being transacted are values falling with a value range, the value range being defined so that a sum of any two values within the range does not exceed an overflow threshold, a sum of the encrypted input value and the encrypted output value equaling zero;
   generating, by the processor, a plurality of rangeproofs, wherein a different rangeproof is associated with each of the input value being transacted and the generated output value, the rangeproofs showing that the value associated with the rangeproof falls within the value range, each rangeproof being associated with a different public key;
   signing each public key, by the processor, with a ring signature based on a public key of a recipient, thereby encrypting the plurality of rangeproofs, wherein a single memory amount is shared among each pubkey;
   storing, by the processor, the encrypted input value, the encrypted output value, and the encrypted rangeproofs in a block; and
   transmitting, by the processor, the block over a network connection to a server storing a publicly verifiable distributed blockchain, the block being subsequently published on the blockchain.

2. The method of claim 1, wherein at least one rangeproof comprises a message from a sender of an asset associated with the transaction to the recipient, the message comprising the blinding amounts for the input value and the generated output value.

3. The method of claim 1, wherein each ring signature for each rangeproof comprises a plurality of component values, each component value being a base ten exponent, each component value being one of two predetermined values.

4. The method of claim 1, wherein each ring signature is associated with a leftover amount that is not scaled by an exponent.

5. The method of claim 1, wherein the value range is set by a sender of an asset associated with the input value.

6. The method of claim 1, the ring signature comprising;
   assigning each digit in the input value to a ring, each ring having a plurality of public keys corresponding to possible values of the digit;
   encrypting each digit using a digit-specific blinding factor;
   assigning a potential value for the digit to a public key for that digit; and
   generating the ring signature using a private key, the ring signature being associated with a correctly-valued public key for each digit.

7. The method of claim 6, further comprising rewriting the input value into base four, wherein each digit in the rewritten input value is assigned to a ring having four public keys corresponding to possible values of the digit.

8. The method of claim 6, further comprising rewriting the input value a floating point value with a base ten exponent, thereby reducing the number of digits in the input value.

9. The method of claim 1, wherein the block further includes an unencrypted fee associated with the transaction.

10. The method of claim 1, wherein the public key is an elliptic curve cryptography pubkey that uses two generators, wherein the first generator and second generator are discrete logs of each other.

11. The method of claim 1, the input value comprising a plurality of input values, and the output value comprising a plurality of output values, wherein each of the plurality of input values and each of the plurality of output values is encrypted and assigned a corresponding rangeproof.

12. A method for verifying an encrypted transaction on a blockchain ledger, the method comprising:
   receiving, by a processor, an encrypted input value, an encrypted output value, and encrypted rangeproofs in a block appended to the blockchain;
   extracting the encrypted input value and the encrypted output value from the received block, the encrypted input value comprising an input value being transacted and a blinding amount, the encrypted output value also comprising an associated blinding amount;
   verifying the transaction if the sum of the encrypted input value and the encrypted output value is zero; and
   denying verification to the transaction if the sum of the encrypted input value and the encrypted output value is a nonzero value.

13. A method for decrypting an amount transacted on a blockchain ledger, the method comprising:
   retrieving a block from a blockchain, the block comprising an encrypted input value, an encrypted output value, and encrypted rangeproofs corresponding to each of the encrypted input value and the encrypted output value;
   generating a ring signature using a private key, the ring signature being associated with a correctly-valued public key for each digit of the encrypted input value, the correctly-valued public key being selected from a group of four public keys for each digit of the encrypted input value;
   applying an XOR operation to the smallest digit of the ring encrypted input value;
   repeating the applying the XOR operation to each digit of the ring encrypted input value;

identifying a repeated pattern within an output of the XOR operation; and using the positions of the repeated pattern within the output of the XOR operation to determine the input value from the encrypted input value.

14. The method of claim 13, wherein at least one rangeproof comprises a message from a sender of an asset associated with the transaction to the recipient, the message comprising the blinding amounts for the input value and the generated output value.

15. The method of claim 13, wherein each ring signature for each rangeproof comprises a plurality of component values, each component value being a base ten exponent, each component value being one of two predetermined values.

16. The method of claim 13, wherein each ring signature is associated with a leftover amount that is not scaled by an exponent.

17. The method of claim 13, wherein the value range is set by a sender of an asset associated with the input value.

18. The method of claim 13, wherein the public key is an elliptic curve cryptography pubkey that uses two generators, wherein the first generator and second generator are discrete logs of each other.

19. The method of claim 13, the input value comprising a plurality of input values, and the output value comprising a plurality of output values, wherein each of the plurality of input values and each of the plurality of output values is encrypted and assigned a corresponding rangeproof.

* * * * *